United States Patent Office 3,359,332
Patented Dec. 19, 1967

3,359,332
PREPARATION OF POLYOXYTETRA-
METHYLENE GLYCOL
Peter R. Johnston, Chapel Hill, N.C., assignor to
Monsanto Company, St. Louis, Mo., a corporation
of Delaware
No Drawing. Filed Apr. 13, 1966, Ser. No. 542,234
7 Claims. (Cl. 260—615)

This application is a continuation-in-part of Ser. No. 297,682, filed July 25, 1963, now abandoned.

This invention relates generally to an improved method for producing polyoxytetramethylene glycols.

Polyhydroxyl compounds containing ether linkages, such as the polyoxytetramethylene glycols have been widely used as lubricants and surface active agents. In addition, they are being employed as intermediates in the preparation of isocyanate-based polymeric elastomers. That is, in the preparation of such elastomers, a polyoxytetramethylene glycol may be reacted with a diisocyanate to form an isocyanate-terminated prepolymer which then is chain-extender with another polymeric segment. Polyurethane-type elastomers prepared in this manner find wide application in the manufacture of such products as foams, plastics, films and segmented elastic fibers.

The particular polyoxytetramethylene glycols to which the novel production method of this invention is addressed are those compounds which are known to be derivable from reactions of ethylene oxide with tetrahydrofuran and derivatives thereof. They are of the general formula

wherein R represents either hydrogen or a lower alkyl of from 1 to 4 carbon atoms, and $n$ is an integer sufficiently large to confer a molecular weight of at least 300 and up to about 10,000 or greater. Over this molecular weight range $n$ would be an integer between about 5–150. The most commonly used compositions of this type are those having molecular weights between about 750 and 3500. In such instances, the numerical value for $n$ would range between about 5 and 50.

Although there are known procedures for preparing the above described glycols, they have serious shortcomings when applied industrially. The major problems have been the necessity for prolonged reaction times of up to 100 hours or better and very low yields. In addition, the resulting polymer products are generally discolored. Further, with the prior methods there has been a general failure to obtain the highly desired narrow molecular weight distribution in the polymer product.

It is, therefore, a principal object of this invention to provide a method for obtaining polyoxytetramethylene glycols in greatly improved yield over a relatively short reaction time.

It is a further object to provide a more simplified and economical method of preparation.

It is a still further object of this invention to provide a method of preparation for polyoxytetramethylene glycols which yields a product having a relatively narrow molecular weight distribution and of high purity.

These and other objects will become apparent as the following description of the invention proceeds.

Generally speaking, the above objects are accomplished by reacting ethylene oxide with a molar excess of tetrahydrofuran or a 2-alkyl substituted tetrahydrofuran in the presence of a novel catalyst system consisting of a boron trifluoride-tetrahydrofuran etherate and water.

This reaction may be conducted over a wide span of temperature conditions being limited on the lower side by the freezing point of tetrahydrofuran and at the higher levels by the occurrence of product degradation. Generally, suitable temperatures are within the range of from −80° C. to 50° C. In instances where the intended use for the polymer product is as an intermediate for the preparation of synthetic elastic fibers, the preferred reaction temperature is in the range of from −20° C. to 5° C. The reason for this is that some product discoloration occurs at temperatures above 5° C. Although this is no problem for some end-uses, it cannot be tolerated in fiber manufacture.

As has been noted, the tetrahydrofuran or derivative thereof is employed in molar excess over the ethylene oxide reactant. The amount of molar excess is not critical except that it must be enough to account for the solubility limitations of ethylene oxide in tetrahydrofuran, i.e., since this is a solution reaction, the ethylene oxide must be fully solubilized in the tetrahydrofuran reactant. Also, for reasons of convenience and economy an unnecessarily large excess of tetrahydrofuran is not desired because of the resulting recovery problem. Generally, good results are accomplished by employing a molar ratio of tetrahydrofuran to ethylene oxide in the range of from 10:1 to 20:1 with 10:1 being preferred. As indicated, in addition to tetrahydrofuran, 2-substituted alkyl derivatives thereof may also be employed with equal success. Suitable compounds may be illustrated by 2-methyltetrahydrofuran, 2-ethyltetrahydrofuran, 2-propyltetrahydrofuran and 2-butyltetrahydrofuran.

The boron trifluoride-tetrahydrofuran etherate catalyst preferably is employed in an amount such as to be in a 1:1 mole ratio with the ethylene oxide reactant. Although some departure can be made from this molar ratio, substantial departures can cause sacrifice in yield or the formation of copolymers.

Boron trifluoride-tetrahydrofuran etherate is a catalyst heretofore known and may be obtained by passing gaseous boron trifluoride into a flask of tetrahydrofuran until the solution becomes saturated as evidenced by the escape of white fumes. At this point, a warm, brown mixture is obtained from which the boron trifluoride-tetrahydrofuran etherate catalyst can be isolated by distillation.

As noted hereinabove, water also serves as a catalyst with the boron trifluoride-tetrahydrofuran etherate. The addition of water to the system is of fundamental importance to the surprising results obtained in the practice of this invention, and particularly with respect to the greatly accelerated reaction rate and vastly improved yields. Thus, it has been surprisingly found that at least a four-fold increase in yield can be realized by the presence of water in the system as contrasted with the yields obtained in the absence of water. The reasons for this striking difference are not clearly understood.

The amounts of water employed are based upon the quantity of the boron trifluoride-tetrahydrofuran etherate used in the system. The molar ratio of the etherate to water should be within the range of about 1:0.01 to 1:1.5 with from 1:0.05 to 1:1.3 being preferred. When quantities of water outside the broadest given range are used, it is found that yields are not much improved over those which are realized in the absence of water.

The water which serves as a catalyst along with the boron trifluoride-tetrahydrofuran complex is conveniently added to the system in admixture with one of the reagents, preferably, the tetrahydrofuran. As stated above, the exact function of these small amounts of water is not known except that the results are greatly improved. Since water will act to hydrolyze the BF$_3$-THF complex and possibly destroy its catalytic activity care should ordinarily be taken to introduce the water and the BF$_3$-THF separately.

To obtain polymer of the desired molecular weight, the polymerization reaction can be terminated at any stage by employing conventional techniques. Thus, for example, the addition of water or other hydroxy containing compounds in suitable volume will effect termination of polymerization. Unreacted tetrahydrofuran may then be removed by distillation. Once the polymer is obtained, it may be purified by first placing it in solution and then repeatedly washing the polymer containing solution with water. Organic solvents such as benzene, toluene, xylene, etc. may be used to obtain solutions of the polymer.

The time allowed for the reaction to run is not critical to the practice of this invention although the use of water and boron trifluoride-tetrahydrofuran as co-catalysts allows for much shorter reaction times than those required in the prior art teachings. Generally speaking, at least about five minutes of reaction time is required to produce enough polymer to make recovery thereof economical. About four hours is the accepted maximum since when running the reaction for longer times the small increase in yield does not warrant the additional time.

The invention will be further illustrated by the following examples without limitation thereto.

EXAMPLE I

The following amounts of materials were used:

|  | Grams | Moles | Mole ratios |
|---|---|---|---|
| Tetrahydrofuran (THF) | 2,700 | 37.5 | 20 |
| Ethylene oxide (EO) | 82 | 1.86 | 1 |
| Water | 17 | 0.94 | 0.5 |
| BF$_3$THF complex | 262 | 1.88 | 1 |

About 500 g. of the THF was employed to absorb the 82 g. of EO. This solution was then placed in a 5-liter flask fitted with agitator and thermometer. Approximately 2050 g. of the THF containing the 17 grams of water was added and the mixture brought to −5° C. The remaining amount of THF of about 150 g. was mixed with the 262 g. of BF$_3$THF complex. This mixture was brought to −5° C. then added to the EO-THF solution at which point reaction began. The reaction was maintained at −5° C. for 17 minutes and was terminated by adding one liter of water. Unreacted THF was removed by distillation. Approximately one liter of benzene was added to the water-polymer mixture and, after mixing, the water layer was separated and discarded. The benzene-polymer solution was washed two more times with water. Finally, the benzene was separated from the polymer by vacuum distillation to leave a residue of 750 g. of a clear, "water white" polymer which according to hydroxyl and group analysis and freezing point depression of benzene had a molecular weight of 1000. The yield of polymer was 40.32 percent based on the ethylene oxide or boron trifluoride-tetrahydrofuran etherate concentrations.

EXAMPLE II

The procedure described in Example I is employed with the exception that the reaction time is extended to 34 minutes. Under these conditions 1200 g. of 2000 molecular weight polymer is obtained.

EXAMPLE III

The procedure described in Example I is employed with the exception that, instead of using 2700 g. of THF, 3200 g. (37.5 moles) of 2-methyl tetrahydrofuran is used to obtain 900 g. of 1200 molecular weight polymer.

In order to illustrate the surprising increase in yield which is realized by supplementing the boron trifluoride-tetrahydrofuran etherate catalyst with the addition of water, comparative examples are given hereinbelow. The procedure followed in each of the preparations was identical to that which has been described in Example I, i.e., polymerization was conducted at a temperature of −5° C. and was allowed to continue for 17 minutes. As will be seen in the table below, the preparation designated Example IV was conducted without adding water to the system and serves as a control. In all other preparations water was added in varying amounts. The substantially increased yields over the control was rapidly apparent. In each example the reaction system contained 20 moles of tetrahydrofuran, 1 mole of ethylene oxide and 1 mole of boron trifluoride etherate.

| Example | Moles of water added to reaction system | Wt. of charge reactants recovered as 1,000 mol. wt. polymer (percent) |
|---|---|---|
| IV | 0 | 6.6 |
| V | 0.03 | 8.7 |
| VI | 0.28 | 21.2 |
| VII | 0.56 | 25.7 |
| VIII | 1.0 | 17.4 |

As has been noted, in addition to greatly improved yields, the method in accordance with this invention provides greatly accelerated reaction rates. Further, the product obtained by the method is of high purity and free of discoloration. These advantages are of particular interest in the preparation of compositions from which segmented, elastic fibers can be fabricated.

The method of this invention has the further advantage over prior procedures in that the polymer products obtained have a relatively narrow molecular weight distribution. That is, the polymer chain fragments are more nearly homogeneous with respect to length.

It will be apparent that many widely different embodiments of this invention may be made without departing from the spirit and scope thereof, and therefore, it is not intended to be limited except as indicated in the appended claims.

I claim:

1. An improved method for preparing polyoxytetramethylene glycols of the formula

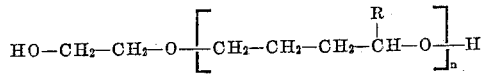

wherein R is selected from the group consisting of H and lower alkyl and $n$ is an integer sufficiently large to confer a molecular weight of at least 300, said method comprising reacting at a temperature between −80° C. and 50° C. as a first reactant, ethylene oxide, with a second reactant selected from the group consisting of tetrahydrofuran and tetrahydrofuran substituted with an alkyl group containing 1–4 carbon atoms in the presence of boron trifluoride-tetrahydrofuran etherate and in the presence of water which has been introduced into the reaction system separately from the boron trifluoride-tetrahydrofuran etherate, the molar ratio of said first reactant and said second reactant being between about 1:10 and 1:20, the molar ratio of said boron trifluoride-tetrahydrofuran etherate to said water being between 1:0.01 and 1:1.5 and the molar ratio of said ethylene oxide and said boron trifluoride-tetrahydrofuran etherate being substantially 1:1.

2. The method of claim 1 wherein said boron trifluoride-tetrahydrofuran etherate and said water are in a molar ratio of between 1:0.05 and 1:1.3.

3. The method of claim 1 wherein the second reactant perature is between −20° C. and 5° C.

4. The method of claim 1 wherein the second reactant is tetrahydrofuran.

5. The method of claim 1 wherein the second reactant is tetrahydrofuran substituted in the beta position with an alkyl group containing 1–4 carbon atoms.

6. The method of claim 2 wherein the second reactant is tetrahydrofuran.

7. The method of claim 2 wherein the second reactant is tetrahydrofuran substituted in the beta position with an alkyl group containing 1–4 carbon atoms.

References Cited

UNITED STATES PATENTS 3,254,056  5/1966  Lovell _____ 260—615 X

FOREIGN PATENTS 898,269  4/1945  France.

LEON ZITVER, *Primary Examiner.*

H. MARS, *Assistant Examiner.*